(12) United States Patent
Tredoux et al.

(10) Patent No.: US 9,219,737 B2
(45) Date of Patent: Dec. 22, 2015

(54) METHOD AND APPARATUS FOR DELIVERY OF SCAN JOBS IN DISCONNECTED NETWORK TOPOLOGIES

(71) Applicant: Xerox Corporation, Norwalk, CT (US)

(72) Inventors: Gavan Leonard Tredoux, Penfield, NY (US); Premkumar Rajendran, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/256,587

(22) Filed: Apr. 18, 2014

(65) Prior Publication Data

US 2015/0304328 A1 Oct. 22, 2015

(51) Int. Cl.
*H04L 29/06* (2006.01)
*H04L 29/08* (2006.01)
*G06F 3/12* (2006.01)
*G06F 11/14* (2006.01)

(52) U.S. Cl.
CPC .............. *H04L 63/10* (2013.01); *H04L 63/02* (2013.01); *H04L 67/02* (2013.01); *G06F 3/1204* (2013.01); *G06F 3/1292* (2013.01); *G06F 11/1451* (2013.01); *H04L 63/18* (2013.01)

(58) Field of Classification Search
CPC . G06F 3/1292; G06F 3/1204; G06F 11/1451; H04L 63/18
See application file for complete search history.

(56) References Cited

U.S. PATENT DOCUMENTS

| | | | | |
|---|---|---|---|---|
| 8,121,982 | B1* | 2/2012 | Panchbudhe | H04W 28/14 707/652 |
| 8,286,253 | B1* | 10/2012 | Lu | G06F 21/6218 726/26 |
| 8,488,211 | B2* | 7/2013 | Ruskin | H04N 1/00307 358/471 |
| 9,124,846 | B2* | 9/2015 | Hansen et al. | H04N 1/4413 1/1 |
| 2003/0115284 | A1* | 6/2003 | Henry | G06F 17/30876 709/217 |
| 2009/0037515 | A1* | 2/2009 | Zapata | H04L 43/0811 709/202 |
| 2010/0077453 | A1* | 3/2010 | Mohanty | G06F 11/1464 726/3 |
| 2012/0096257 | A1* | 4/2012 | Li | G06F 21/78 713/150 |
| 2012/0105905 | A1* | 5/2012 | Wei | G06F 3/1204 358/1.15 |
| 2012/0172004 | A1* | 7/2012 | Silva | H04L 12/1831 455/412.1 |
| 2012/0255026 | A1* | 10/2012 | Baca | G06F 21/10 726/26 |
| 2012/0307316 | A1* | 12/2012 | De Muelenaere | H04N 1/00222 358/444 |
| 2013/0027741 | A1* | 1/2013 | Liu | G06F 3/1204 358/1.15 |
| 2013/0094047 | A1* | 4/2013 | Bailey | H04L 63/18 358/1.14 |
| 2014/0240768 | A1* | 8/2014 | Kimura | G06F 3/1204 358/1.15 |
| 2014/0268205 | A1* | 9/2014 | DuBois | H04L 67/10 358/1.14 |
| 2014/0268232 | A1* | 9/2014 | Uchikawa | G06F 3/1292 358/1.15 |

OTHER PUBLICATIONS

Auditing and Securing Multifunction Devices; Charles H. Scott, Jr; SANS Institute; 2007.*
Samsung Multifunction Printer Security; White Paper; Samsung Security Framework; Version—Rev1A; 2011.*
The Hidden IT Security Threat: Multifuction Printers; Feb. 7, 2013; Larry Kovnat; forbes.com; accessed Sep. 3, 2015.*

* cited by examiner

*Primary Examiner* — James Turchen

(57) ABSTRACT

A method, non-transitory computer readable medium, and apparatus for delivering a document obtained on a remote network that is disconnected from a protected network are disclosed. For example, the method receives the document at the remote network that is disconnected from the protected network, stores the document on the mobile endpoint device, detects a presence of the protected network, delivers the document to a repository on the protected network and deletes the document from the mobile endpoint device.

16 Claims, 3 Drawing Sheets

METHOD AND APPARATUS FOR DELIVERY OF SCAN JOBS IN DISCONNECTED NETWORK TOPOLOGIES

The present disclosure relates generally to document and file management and, more particularly, to a method and apparatus for delivery of scan jobs in disconnected network topologies.

BACKGROUND

Due to security concerns, many networks are isolated from general access. For example, some networks are firewalled off from the Internet and incoming traffic to the network is tightly controlled. If a user of a company having the protected or isolated network is in a remote location, for example another company, accessing the protected network is problematic. For example, the user may encounter problems if the user wishes to scan documents because he or she has access to paper originals at the remote location, but wants to store these documents in a repository in his or her own company's secure network.

Some of the existing solutions for this problem involve setting up a virtual private network (VPN) to permit controlled remote access. However, VPNs require complex setup steps and the remote locations themselves may not permit outgoing connections to such networks since that may compromise the security of the remote network.

Other solutions require manual steps that are tedious and error-prone. For example, the users may forget to transfer data or delete data off of temporary storage devices. In addition, the data may be accessible and visible on the temporary storage devices, thus requiring additional encrypting the temporary storage device. Typically, encrypting the temporary storage device requires an "all or nothing" encryption to access the temporary storage device, which can also be a hassle for the user.

SUMMARY

According to aspects illustrated herein, there are provided a method, a non-transitory computer readable medium, and an apparatus for delivering a document obtained at a remote network that is disconnected from a protected network. One disclosed feature of the embodiments is a method that receives the document at the remote network that is disconnected from the protected network, stores the document on the mobile endpoint device, detects a presence of the protected network, delivers the document to a repository on the protected network and deletes the document from the mobile endpoint device.

Another disclosed feature of the embodiments is a non-transitory computer-readable medium having stored thereon a plurality of instructions, the plurality of instructions including instructions which, when executed by a processor, cause the processor to perform an operation that receives the document at the remote network that is disconnected from the protected network, stores the document on the mobile endpoint device, detects a presence of the protected network, delivers the document to a repository on the protected network and deletes the document from the mobile endpoint device.

Another disclosed feature of the embodiments is an apparatus comprising a processor and a computer readable medium storing a plurality of instructions which, when executed by the processor, cause the processor to perform an operation that receives the document at the remote network that is disconnected from the protected network, stores the document on the mobile endpoint device, detects a presence of the protected network, delivers the document to a repository on the protected network and deletes the document from the mobile endpoint device.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and non-transitory computer-readable medium for delivering a document obtained at a remote network that is disconnected from a protected network. As discussed above, many networks are isolated from general access. For example, some networks are firewalled off from the Internet and incoming traffic to the network is tightly controlled. If a user of a company having the protected or isolated network is in a remote location, for example another company, accessing the protected network is problematic. For example, the user may encounter problems if the user wishes to scan documents because he or she has access to paper originals at the remote location, but wants to store these documents in a repository in his or her own company's secure network.

One embodiment of the present disclosure addresses this problem by utilizing a user's mobile endpoint device to automatically deliver documents to the repository in the company's secure network when the mobile endpoint device detects the presence of the secure or isolated network. The mobile endpoint device may automatically deliver the document and delete the document from the mobile endpoint device. In other words, the user does not need to perform any document management from the remote network that the document was received from to the secure or isolated network that the document is delivered to.

Figure 1:
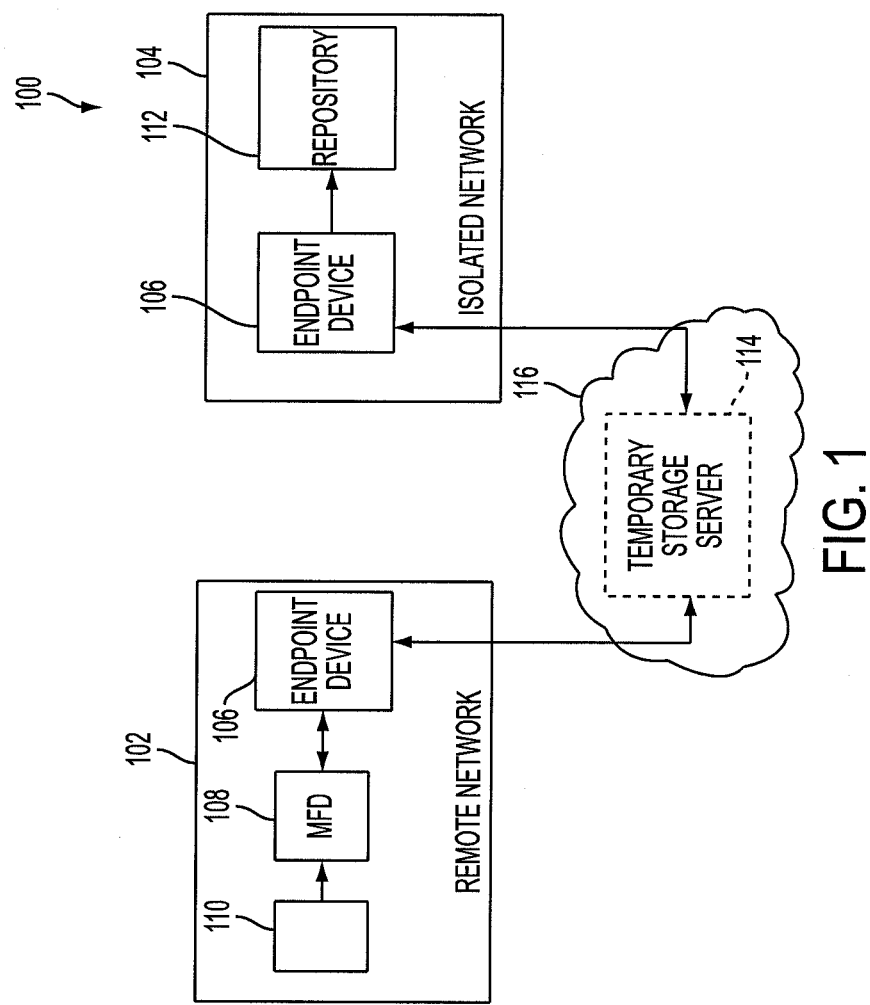
FIG. 1 illustrates an example block diagram of a system of the present disclosure.

FIG. 1 illustrates one example architecture 100 of the present disclosure. The architecture 100 may include a remote network 102, an isolated network 104 and a mobile endpoint device 106. In one embodiment, the mobile endpoint device 106 may be any type of mobile endpoint device capable of receiving and storing scanned documents. For example, the mobile endpoint device 106 may be a smart phone, a mobile telephone, a tablet computer, a lap top computer, a netbook computer, and the like.

The mobile endpoint device 106 may be moved by a user back and forth between the remote network 102 and the isolated network 104. Although, FIG. 1 illustrates the mobile endpoint device 106 appearing in both the remote network 102 and the isolated network 104, it should be noted that the mobile endpoint device 106 is not simultaneously located at both the remote network 102 and the isolated network 104. Rather, FIG. 1 should be interpreted as showing the mobile endpoint device 106 at the remote network 102 and the isolated network 104 at different times.

In one embodiment, the isolated network 104 may be a communication network of an enterprise or company that is protected from outside communication networks. In other words, the isolated network 104 may be a local area network (LAN) that cannot communicate out of the LAN to a wide area network, Internet, and the like. The isolated network 104 may be physically disconnected from a wide area network or the Internet or may be firewalled to prevent any incoming or outgoing connections to the wide area network or the Internet.

For example, for security reasons, the enterprise may not trust any outside communication networks and completely isolate the isolated network 104 from any outside communication networks. As a result, the remote network 102 cannot reach or communicate with in any capacity the isolated network 104. For example, a virtual private network (VPN) connection cannot be made to the isolated network 104 from the remote network 102.

In one embodiment, the isolated network 104 may include a repository 112. The repository 112 may be a server or database deployed in hardware (e.g., a general purpose computer 300 illustrated in FIG. 3). The repository 112 may also be completely isolated from any outside communications. Said another way, there is no way to connect to and communicate with the repository 112 outside of the isolated network 104. Said yet another way, no VPN connection or any other traditionally used secure connection methods over the Internet can be made to the repository 112.

In one embodiment, the mobile endpoint device 106 may be registered with the isolated network 104 of the enterprise. For example, the isolated network 104 may keep a list of media access control (MAC) addresses of devices that are authorized to connect to the isolated network 104 or provide a token to the mobile endpoint device 106 to use as credentials to connect to the isolated network 104, and so forth. The registration provides the mobile endpoint device 106 permission and authorization to communicate with other devices within the isolated network 104 (e.g., the repository 112) via a wired or wireless connection.

In one embodiment, the remote network 102 may be a customer site or a location of another company. The remote network 102 may include a multi-function device (MFD) 108. In one embodiment, the MFD 108 may be a scanner, a printer/scanner, a copy/scanner, or any other device capable of scanning a document. The MFD 108 may include near field communications (NFC) tags to for "tap to scan" functionality with the mobile endpoint device 106.

It should be noted that the remote network 102 and the isolated network 104 are simplified for ease of explanation. The remote network 102 may include additional network elements or access networks not shown. The isolated network 104 may include additional network elements within the isolated network 104 to enable the LAN without connecting to any external communication networks.

In the example architecture 100 illustrated in FIG. 1, the remote network 102 has no way of communicating with or connecting to the isolated network 104. In addition, the mobile endpoint device 106 cannot communicate with or connect to the isolated network 104 while at the remote network 102 or while outside a range of the isolated network 104. The user of the mobile endpoint device 106 may want to implement an option to "scan document to repository" (e.g., the repository 112 in the isolated network 104). Thus, if a user of the mobile endpoint device 106 wants to scan one or more documents 110 via the MFD 108 (e.g., using a "tap to scan" command) at the remote network 102 and deliver the one or more documents 110 to the repository 112 in the isolated network 104 using the "scan document to repository" option, the user may be unable to do so given the example architecture 100.

As noted above, one available option would be a manual process using a temporary storage device (e.g., a universal serial bus (USB) thumb drive) and manually transferring a document from the temporary storage device to the repository 112 when the user returns to the isolated network 104. However, such a manual process is prone to errors and potential security issues. For example, during the manual process the user may forget to delete the document off of the temporary storage device after the document is transferred. In addition, the user may not encrypt the document since this typically requires the user to encrypt the entire temporary storage device, which may be a nuisance and inconvenient for the user. Alternatively, if the user does encrypt the entire temporary storage device, the encryption is typically a weak encryption since it requires the user to remember the password or pass code.

In contrast, an automated method of the present disclosure provides a more convenient and a more accurate method for delivering the document 110 to the repository 112 in the isolated network 104 than methods that are currently available. The disclosed method may still allow the user to select an option to "scan document to a repository". However, the mobile endpoint device 106 may delay the delivery of the scanned document 110 to the repository 112 of the isolated network 104 until a later time when the mobile endpoint device 106 is able to connect to the isolated network 104. For example, the mobile endpoint device 106 that is registered with the isolated network 104 and authorized to communicate with devices within the isolated network 104 may automatically deliver scanned documents to the repository 112 when the mobile endpoint device 106 detects the presence of the isolated network 104. In addition, the scanned documents are automatically deleted from the mobile endpoint device 106 after being delivered to the repository 112.

Furthermore, the mobile endpoint device 106 may use a strong encryption (e.g., Pretty Good Privacy (PGP), Advanced Encryption Standard (AES), and the like) when the document 110 is received. Any type of strong encryption method may be used and the strong encryption may be on a per-document basis. In addition, the user of the mobile endpoint device 106 need not know what the strong encryption is or be involved with selecting the strong encryption. As a result, the delivery of the document 110 to the repository 112 in the isolated network 104 by the mobile endpoint device 106 may be fully automated without user intervention or manually management by the user.

In one embodiment, the mobile endpoint device 106 may automatically detect that the mobile endpoint device 106 is within the presence of the isolated network 104 based on detecting a local wireless broadcast signal of the isolated network. For example, a Wi-Fi signal of the isolated network 104 may be within range and displayed as an available network on the mobile endpoint device 106.

In another embodiment, the mobile endpoint device 106 may automatically detect that the mobile endpoint device 106 is within the presence of the isolated network 104 based upon a wired Ethernet connection to the isolated network. For example, an Ethernet cable may be connected to the mobile endpoint device 106 and the mobile endpoint device 106 may recognize the isolated network 104 via an Internet Protocol (IP) address.

In yet another embodiment, the mobile endpoint device 106 may automatically detect that the mobile endpoint device 106 is within the presence of the isolated network 104 using a global positioning system (GPS) radio on the mobile endpoint device 106. For example, the enterprise that has the isolated network 104 may be associated with particular GPS coordinates. The mobile endpoint device 106 may detect when the user has moved the mobile endpoint device 106 within the GPS coordinates of the enterprise. The mobile endpoint device 106 may then attempt to connect to the isolated network 104 via a wired or wireless connection.

In one embodiment, a temporary storage server 114 may be used. The temporary storage server 114 may be stored in a remote network 116 that is accessible over the Internet. In one embodiment, the mobile endpoint device 106 may transmit the encrypted document 110 to the temporary storage server 114. When the mobile endpoint device 106 automatically detects the presence of the isolated network 104, the mobile endpoint device 106 may then connect to the temporary storage server 114, retrieve the document 110 from the temporary storage server 114 and deliver the document 110 to the repository 112, as described above.

It should be noted that the mobile endpoint device 106 is not connected to the isolated network 104 when the mobile endpoint device 106 connects to the temporary storage server 114. The mobile endpoint device 106 may first connect to the temporary storage server 114 to retrieve the document 110, disconnect from the temporary storage server 114 and then connect to the repository 112 in the isolated network 104 to maintain the protection and isolation of the isolated network 104.

In one embodiment, the mobile endpoint device 106 may transmit a confirmation to the temporary storage server 114 that the document 110 was received to initiate a deletion of the document 110 from the temporary storage server 114. In other words, once the document 110 is retrieved by the mobile endpoint device 106, the document 110 is deleted automatically from the temporary storage server 114.

It should be noted that although the examples above are described in associated with a single document 110 that is scanned, the described methods may be performed for a plurality of documents 110. In other words the methods described herein may be performed as an operation on a batch of the plurality of documents 110 (i.e., as opposed to one document at a time performed in a serial fashion). For example, the mobile endpoint device 106 may receive a plurality of different scanned documents 110, store the plurality of different scanned documents 110, deliver the plurality of different scanned documents 110 simultaneously to the repository 112 automatically and delete all of the plurality of scanned documents 110 from the mobile endpoint device 106 using the methods described above.

In addition, although only a single remote location 102 is illustrated in FIG. 1, it should be noted that any number of remote locations 102 may be deployed. For example, the user may travel to multiple different remote locations 102 to receive and store scanned documents 110 on his or her mobile endpoint device at each one of the different remote locations 102. When the user returns to the isolated network 104 and the mobile endpoint device 106 detects the presence of the isolated network 104, the mobile endpoint device 106 may automatically deliver the scanned documents 110 to the repository 112 and then delete the scanned documents 110 from the mobile endpoint device 106.

Figure 2:
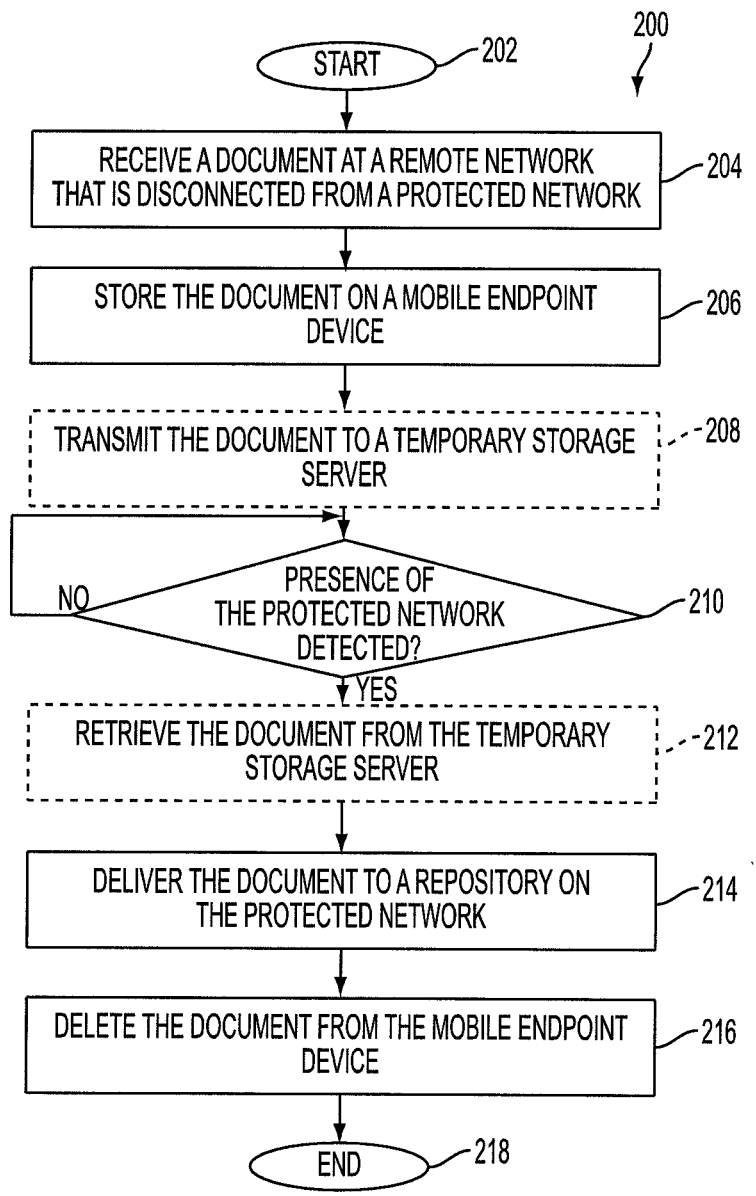
FIG. 2 illustrates an example flowchart of one embodiment of a method for delivering a document obtained at a remote network that is disconnected from a protected network.
Figure 3:
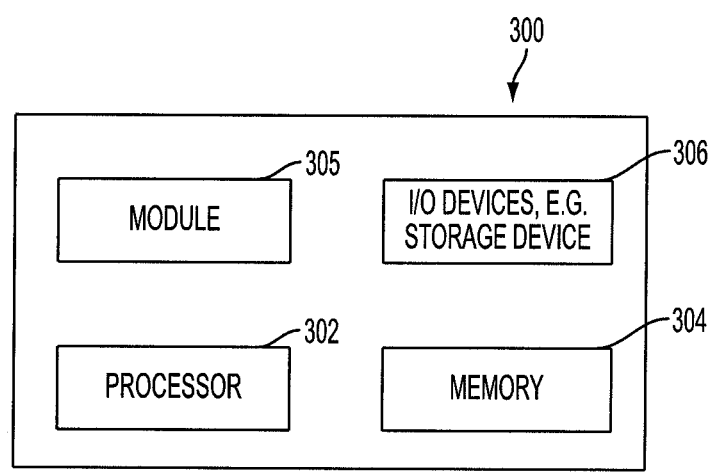
FIG. 3 illustrates a high-level block diagram of a general-purpose computer suitable for use in performing the functions described herein.

FIG. 2 illustrates a flowchart of a method 200 for delivering a document obtained on a remote network that is disconnected from a protected network. In one embodiment, one or more steps or operations of the method 200 may be performed by the endpoint 102 or a general-purpose computer as illustrated in FIG. 3 and discussed below.

At step 202 the method 200 begins. At step 204, the method 200 receives a document at a remote network that is disconnected from a protected network. For example, an employee or a user of an enterprise may have a mobile endpoint device that is registered to connect with and communicate with an isolated network of the enterprise. The user may be traveling to a customer site that has the remote network to scan documents (e.g., medical forms, images, pictures, text files, and the like) that may be private and confidential. The user may use his or her mobile endpoint device to initiate a scan of one or more documents via a MFD over the remote network of the customer site.

For example, the mobile endpoint device may be connected to the MFD over a wired or wireless connection at the remote network. The mobile endpoint device may then use the user interface of the mobile endpoint device to initiate scanning of documents. Alternatively, the MFD may be equipped with NFC tags that can be read by the mobile endpoint device to use "tap to print" or "tap to scan" commands associated with the NFC tags on the MFD.

At step 206, the method 200 stores the document on a mobile endpoint device. The scanned documents that are received may be stored in the mobile endpoint device. In one embodiment, the scanned documents may be encrypted with a strong encryption before storing the scanned documents. The strong encryption may be unknown to the user of the mobile endpoint device. The user of the mobile endpoint device is not required to generate keys, passwords or pass codes.

In one embodiment, if more than one document is scanned and stored on the mobile endpoint device, each one of the scanned documents may be encrypted independently. In other words, the encryption may be performed on a per-document basis.

At optional step 208, the method 200 may transmit the document to a temporary storage server. In one embodiment, the mobile endpoint device may connect to a temporary storage server located in a remote network via the Internet and transmit the encrypted documents to the temporary storage server.

At step 210, the method 200 determines if a presence of the protected network is detected. For example, the user may take his or her mobile endpoint device and travel back to the protected network within the enterprise location. The mobile endpoint device may detect the presence of the protected network when it enters the enterprise location using any one of the methods described above (e.g., a detection of a wireless broadcast signal of the protected network, a detection of wired Ethernet connection to the protected network, a GPS signal, and the like).

If the presence of the protected network is not detected, the method 200 may loop within step 210 until the protected network is detected. When the protected network is detected, the method 200 may proceed to optional step 212 or directly to step 214.

At optional step 212, the method 200 may retrieve the document from the temporary storage server. For example, if the temporary storage server was used at optional step 208, the mobile endpoint device may connect to the temporary storage server and retrieve the scanned documents that are encrypted. In one embodiment, the mobile endpoint device may transmit a confirmation to the temporary storage server that the desired scanned documents have been successfully retrieved such that the temporary storage server may initiate automatic deletion of the scanned documents that were retrieved.

It should be noted that the mobile endpoint device is not connected to the protected network while connected to the temporary storage server. This helps to maintain the isolation of the protected network of the enterprise and prevent unauthorized users from entering the private network through the connection between the temporary storage server and the mobile endpoint device.

At step 214, the method 200 may deliver the document to a repository on the protected network. For example, the mobile endpoint device may connect to the repository over the protected network. The mobile endpoint device may decrypt the encrypted scanned documents and transmit the scanned documents to the repository for storage.

As noted above, the mobile endpoint device may be pre-registered with the protected network for authorization to connect to devices within the protected network (e.g., the repository). When the mobile endpoint device attempts to connect to the protected network, the protected network may authenticate the mobile endpoint device via a media access control (MAC) address of the mobile endpoint device, a password, and the like. For example, a general application server and database storing a list of authorized endpoint devices (not shown) may be used to perform the authentication.

At step 216, the method 200 may delete the document from the mobile endpoint device. For example, once the scanned documents are transmitted to the repository, the mobile endpoint device may automatically delete the scanned documents from the mobile endpoint device itself. The method 200 ends at step 218.

Thus, method 200 provides an automated method that is more convenient and accurate than the currently available methods. For example, no complex VPN connection is required (nor can one be established as the protected network is completely isolated from outside connections). In addition, no manual procedures are required by the user with respect to the delivery and deletion of the scanned documents. The user is only required to scan the documents via the MFD to the mobile endpoint device and transport the mobile endpoint device from the remote network to the protected network. The mobile endpoint device automatically performs the connection to the protected network, the delivery of the scanned documents to the repository in the protected network and deletion of the scanned documents from the mobile endpoint device after the scanned documents are delivered.

It should be noted that although not explicitly specified, one or more steps, functions, or operations of the method 200 described above may include a storing, displaying and/or outputting step as required for a particular application. In other words, any data, records, fields, and/or intermediate results discussed in the methods can be stored, displayed, and/or outputted to another device as required for a particular application. Furthermore, steps, functions, or operations in FIG. 2 that recite a determining operation, or involve a decision, do not necessarily require that both branches of the determining operation be practiced. In other words, one of the branches of the determining operation can be deemed as an optional step.

FIG. 3 depicts a high-level block diagram of a general-purpose computer suitable for use in performing the functions described herein. As depicted in FIG. 3, the system 300 comprises one or more hardware processor elements 302 (e.g., a central processing unit (CPU), a microprocessor, or a multi-core processor), a memory 304, e.g., random access memory (RAM) and/or read only memory (ROM), a module 305 for delivering a document obtained at a remote network that is disconnected from a protected network, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the general-purpose computer may employ a plurality of processor elements. Furthermore, although only one general-purpose computer is shown in the figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 305 for delivering a document obtained at a remote network that is disconnected from a protected network (e.g., a software program comprising computer-executable instructions) can be loaded into memory 304 and executed by hardware processor element 302 to implement the steps, functions or operations as discussed above in connection with the exemplary method 200. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for delivering a document obtained at a remote network that is disconnected from a protected network (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for delivering a document obtained at a remote network that is disconnected from a protected network, the method comprising:
   receiving, by a processor of a mobile endpoint device, the document at the remote network that is disconnected from the protected network when a scan document to repository option is selected to delay delivery of the document to the protected network, wherein the scan document to repository option scans the document to a repository located in the protected network remote from the mobile endpoint device;
   storing, by the processor, the document on the mobile endpoint device by encrypting the document on the mobile endpoint device on a per-document basis using a strong encryption that is unknown by a user of the mobile endpoint device in response to the scan document to repository option being selected;
   detecting, by the processor, a presence of the protected network, wherein the mobile endpoint device is registered with the protected network and authorized to connect to and to communicate with the protected network;
   delivering, by the processor, the document to the repository on the protected network; and
   deleting, by the processor, the document from the mobile endpoint device.

2. The method of claim 1, wherein the protected network comprises a local area network of an enterprise.

3. The method of claim 2, wherein the protected network does not have a connectivity to an Internet.

4. The method of claim 1, wherein the document comprises a scanned document from a multi-function device at the remote network.

5. The method of claim 1, wherein the storing further comprises:
   transmitting, by the processor, the document from the mobile endpoint device to a temporary storage server.

6. The method of claim 5, wherein the transmitting further comprises:
   connecting, by the processor, to the temporary storage server;
   retrieving, by the processor, the document from the temporary storage server; and
   transmitting, by the processor, a confirmation to the temporary storage server that the document was received to initiate a deletion of the document from the temporary storage server.

7. The method of claim 1, wherein the delivering is performed over a wired connection or a wireless connection to the repository.

8. A non-transitory computer-readable medium storing a plurality of instructions, which when executed by a processor of a mobile endpoint device, cause the processor to perform operations for delivering a document obtained at a remote network that is disconnected from a protected network, the operations comprising:
   receiving the document at the remote network that is disconnected from the protected network when a scan document to repository option is selected to delay delivery of the document to the protected network, wherein the scan document to repository option scans the document to a repository located in the protected network remote from the mobile endpoint device;
   storing the document on the mobile endpoint device by encrypting the document on the mobile endpoint device on a per-document basis using a strong encryption that is unknown by a user of the mobile endpoint device in response to the scan document to repository option being selected;
   detecting a presence of the protected network, wherein the mobile endpoint device is registered with the protected network and authorized to connect to and to communicate with the protected network;
   delivering the document to the repository on the protected network; and
   deleting the document from the mobile endpoint device.

9. The non-transitory computer-readable medium of claim 8, wherein the protected network comprises a local area network of an enterprise.

10. The non-transitory computer-readable medium of claim 9, wherein the protected network does not have a connectivity to an Internet.

11. The non-transitory computer-readable medium of claim 8, wherein the document comprises a scanned document from a multi-function device at the remote network.

12. The non-transitory computer-readable medium of claim 8, wherein the storing further comprises:
   transmitting the document from the mobile endpoint device to a temporary storage server.

13. The non-transitory computer-readable medium of claim 12, wherein the transmitting further comprises:
   connecting to the temporary storage server;
   retrieving the document from the temporary storage server; and
   transmitting a confirmation to the temporary storage server that the document was received to initiate a deletion of the document from the temporary storage server.

14. The non-transitory computer-readable medium of claim 8, wherein the delivering is performed over a wired connection or a wireless connection to the repository.

15. A method for delivering a document obtained at a remote network that is disconnected from a protected network, the method comprising:
   connecting, by a processor of a mobile endpoint device, to a multi-function device, wherein the multi-function device is located in the remote network that is disconnected from the protected network;
   initiating, by the processor, a scan of the document when a scan document to repository option is selected to delay delivery of the document to the protected network, wherein the scan document to repository option scans the document to a repository located in the protected network remote from the mobile endpoint device;
   receiving, by the processor, a scanned document from the multi-function device;
   storing, by the processor, the scanned document on the mobile endpoint device by encrypting the document on the mobile endpoint device on a per-document basis using a strong encryption that is unknown by a user of the mobile endpoint device in response to the scan document to repository option being selected;
   detecting, by the processor, that the mobile endpoint device has moved to a location of an enterprise based on a detection of a presence of the protected network of the enterprise, wherein the mobile endpoint device is registered with the protected network and authorized to connect to and to communicate with the protected network;

connecting, by the processor, to the repository within the protected network;
delivering, by the processor, the scanned document to the repository on the protected network; and
deleting, by the processor, the scanned document from the mobile endpoint device.

16. The method of claim 15, wherein the protected network does not have a connectivity to an Internet.

* * * * *